United States Patent [19]

Collignon et al.

[11] 4,205,413
[45] Jun. 3, 1980

[54] SWIVEL LOCK AND BRAKE MECHANISM FOR CASTERS

[75] Inventors: Herbert E. Collignon; Robert H. Godwin, both of Evansville, Ind.

[73] Assignee: Bliss & Laughlin Industries, Inc., Oak Brook, Ill.

[21] Appl. No.: 2,444

[22] Filed: Jan. 10, 1979

[51] Int. Cl.² ............................................ B60B 33/00
[52] U.S. Cl. .................................................. 16/35 D
[58] Field of Search ............. 16/35 R, 35 D; 188/1 D

[56] References Cited

U.S. PATENT DOCUMENTS

| 3,604,212 | 9/1971 | Lewin | 16/35 R |
| 3,974,542 | 8/1976 | Timmer et al. | 16/35 R |
| 4,035,864 | 7/1977 | Schroder | 16/35 R |
| 4,114,232 | 9/1978 | Umeda | 16/35 R |

*Primary Examiner*—George H. Krizmanich
*Attorney, Agent, or Firm*—Woodard, Weikart, Emhardt & Naughton

[57] ABSTRACT

A caster assembly is provided with a housing readily mountable into rectangular, square or round tubing and securable therein. A lever operable in a horizontal plane about the swivel axis is pivotable from a first position for free swiveling and rolling of the caster, to a second position for swivel locking in the trailing position, to a third position for swivel and wheel locking. It is readily attached to a centralized control handle on a bed or other object to be supported by the caster.

17 Claims, 13 Drawing Figures

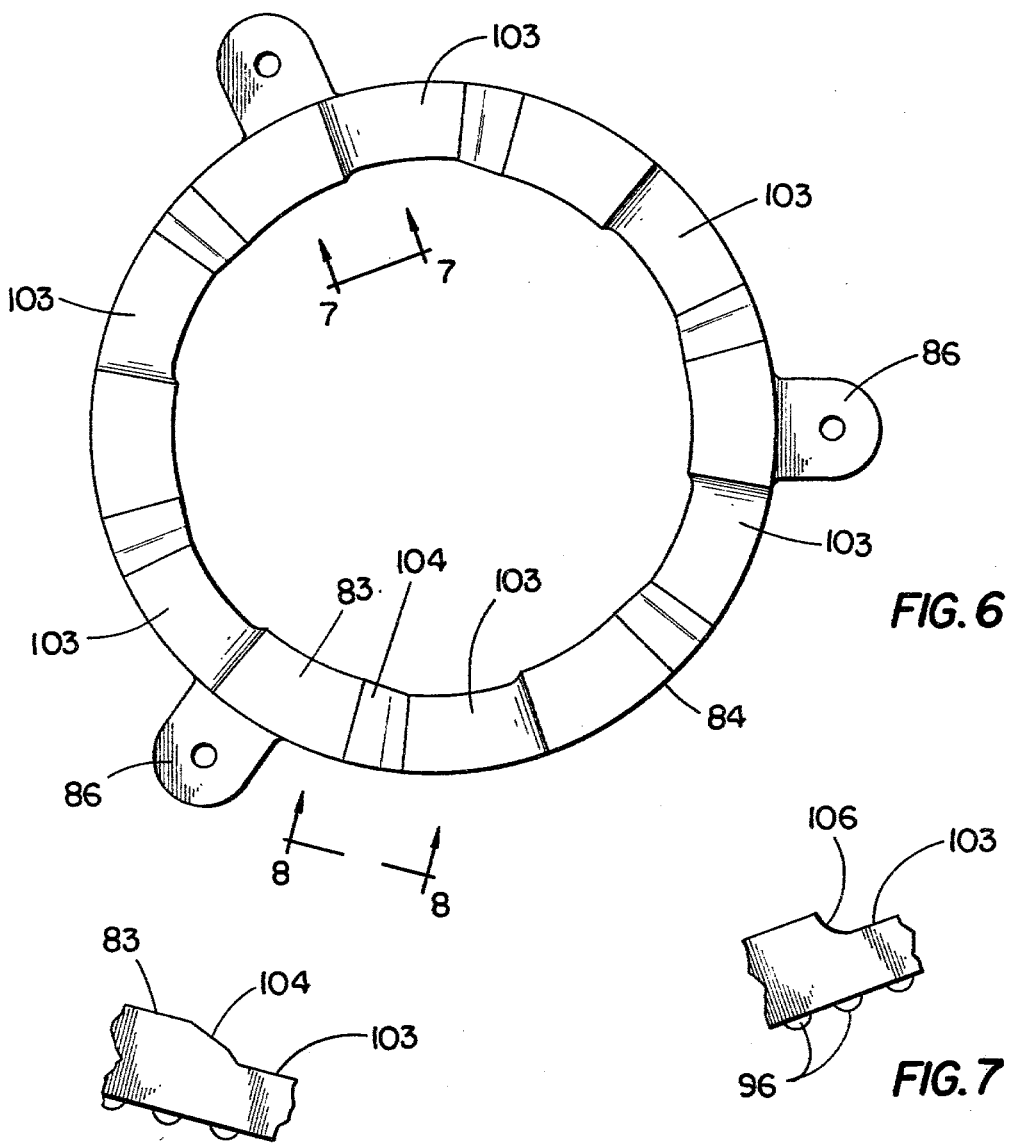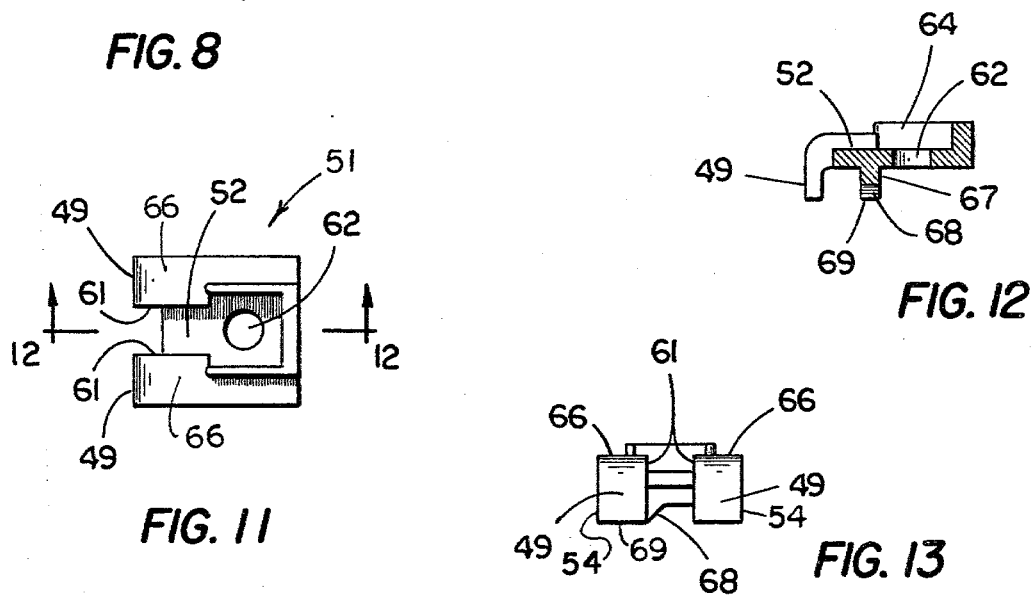

SWIVEL LOCK AND BRAKE MECHANISM FOR CASTERS

BACKGROUND OF THE INVENTION

1. Field of the Invention

This invention relates generally to casters, and more particularly to casters having means for selectively locking the caster in a trailing (tracking) position, so that it does not swivel from that position, and alternately to lock both the swivel and the wheel, so the caster will neither swivel nor roll.

2. Description of the Prior Art

Casters having anti-shimmy features are known. An example is shown in U.S. Pat. No. 2,480,524 where a resilent arm 19 presses against a stationary shell 9 of the assembly to minimize shimmy of the caster as it rolls along a surface. U.S. Pat. No. 3,518,714 discloses a device for preventing swiveling of a caster when it leaves contact with the ground.

Other arrangements have been made to actually lock the caster swivel. An example of a spring loaded manually adjustable detent lock appears in U.S. Pat. No. 2,654,112. U.S. Pat. No. 3,636,586 discusses problems involved in combinations of swiveling and nonswiveling wheels on push carts and pull carts, and provides a caster in which there is a member for locking the swiveling of selected casters on a piece of equipment such as stretchers or other emergency hospital equipment. Swivel locking therein involves operating a lever about a horizontal axis. U.S. Pat. No. 3,974,542 provides a swivel lock which can be actuated by horizontal linear movement of a slide control lever.

Some patents disclosing simultaneous braking of the wheel and locking of the swivel are as follows: U.S. Pat. Nos 2,484,094; 2,494,696; 2,572,548; 2,707,794; 2,709,828; 3,239,873; and 3,571,842. The casters shown in these patents have various ways of locking the swivel and brake, and the last patent on the list uses a push button which can be pushed to lock the caster, and then pushed again, to release the caster. These patents lock the wheel and swivel simultaneously. However, there are many instances where it is desireable to be able to lock the caster from swiveling, without necessarily braking the wheel, but also to brake the wheel, if desired.

There are U.S. patents disclosing casters in which swivel locking can be achieved, independently of wheel locking, but both can be achieved, if desired. An example is U.S. Pat. No. 2,915,775 to Skupas. In that patent, position 61 for the lever 51 provides locking of both the swivel and the wheel. Position 63 of the lever provides locking of only the swivel. The position intermediate 61 and 63 frees both the swivel and wheel. The patent discloses four notches 23 in the stationary portion of the assembly, and which can be used to establish four swivel positions, ninety degrees from each other. The patent discloses varying the number of swivel lock positions, if desired. In this instance, as in some of the above mentioned patents, the lever is foot operated and pivots about a horizontal axis.

Another patent which discloses means for locking the wheel from rolling and horn from swiveling is U.S. Pat. No. 3,055,042. In this example, clockwise rotation of the member 86 about a vertical axis of swiveling of the caster, serves to lock both the wheel and the horn, simultaneously. If it desired to lock the horn for two front casters in a trailing position, spring-loaded detents 156 are provided and operable independently of the brake applying notched disk 86. There does not appear to be any single lever operable to alternately apply a swivel lock, or a combination of the swivel and wheel lock.

U.S. Pat. No. 3,388,419 discloses a caster in which a lever 50 operable about a horizontal axis can be used to lock against both rotation of the wheel and swiveling of the caster in one position, against swiveling only in another position, or permit both swiveling and wheel rotation in the third position. It employs a combination of levers and links to do this. Haussels U.S. Pat. No. 3,911,525 discloses another arrangement for either locking the swivel, or locking both the swivel and the wheel, and uses a longitudinally vertically movable shaft having alternate positions to achieve these alternate results, and a third position to permit both free swiveling and rolling. It discloses a centrally locatable caster with a "fixing pin" 1 for projecting into a foot of a hospital bed and having an adjusting bolt extending axially through the pin and movable axially by a central adjusting linkage for operation of the caster control.

In addition to the Haussels U.S. Pat. No. 3,911,525 mentioned above, there are other patents disclosing the use of centralized control for simultaneous operation of swivel or braking mechanisms on casters. For example, Shepherd Pat. No. 3,159,865 shows apparatus wherein lever and link mechanism operating on horizontal axis serve to operate a vertical plunger in a bed post to simultaneously brake both the swivel and wheel. The weight of the bed is used to apply the braking force.

U.S. Pat. Nos. 3,431,584 and 3,479,681 show casters which use separately operable levers to simultaneously operate swivel locks, or brake locks in caster assemblies. Here also it is necessary that the mechanisms be operable down through the center of the swivel axis of the casters. In the later of these two patents, the raising of locking lever 212 for the swivel lock will cause a pin to drop in one of the circularly spaced holes in the horn assembly, to provide the swivel locking effect. The above mentioned U.S. Pat. No. 3,055,042 suggests remote control of various casters on an apparatus but, does not provide the single-lever option of either locking the swivel or locking both the swivel and the wheel.

U.S. Pat. No. 3,142,086 discloses a centrally operable handle 22 for operating slide bars simultaneously engage the horns of four casters on a typewriter stand, to prevent swiveling of the casters, but still permits the wheels to roll.

U.S. Pat. No. 2,728,936 discloses a lever 176 for engaging a lug in a notch in a horn to prevent swiveling, and another lever 192 for squeezing the sides of the horn together against the sides of the wheel to provide braking action.

There might very well be additional prior art disclosing various types of caster swivel and braking mechanism. The above art is the most pertinent known to us. Yet it does not provide apparatus which is simple in construction, operable by a single lever pivoting about a vertical axis to facilitate remote operation from a single point on a hospital bed or other equipment to provide the three options of free wheeling and swiveling, free wheeling without swiveling, and the combination of swivel and wheel locking. The present invention is addressed to this remaining need.

BRIEF SUMMARY OF THE INVENTION

Described briefly, according to a typical embodiment of the present invention, the caster assembly can include various types of means for mounting to a bed or other equipment which will be the load borne by the caster assembly. A horn is swivel mounted to the caster mounting means, and a wheel is rotatably mounted to the horn. A lever operable in an arc in a horizontal plane can be moved from one position where there is free wheeling and swiveling of the caster, to another position where there is free wheeling but swiveling is limited to a trailing (sometimes referred to as "tracking") position, and then a third lever position in which both the wheel and the swivel are locked. Since a comparatively small arcuate movement is needed for transition from the one extreme to the other, a simple linkage can be employed with the equipment mounted on the casters, to achieve the desired caster operation.

BRIEF DESCRIPTION OF THE DRAWINGS

FIG. 6 is a top view of the brake shoe.

FIG. 7 is a fragmentary elevational view taken at line 7—7 in FIG. 6 and viewed in the direction of the arrows.

FIG. 8 is a fragmentary elevational view taken at line 8—8 in FIG. 6 and viewed in the direction of the arrows.

FIG. 11 is a top plan view of the tracking tab housing.

FIG. 12 is a section taken at line 12—12 in FIG. 11 and viewed in the direction of the arrows.

FIG. 13 is an end view of the tracking tab housing.

DETAILED DESCRIPTION

Figure 1:
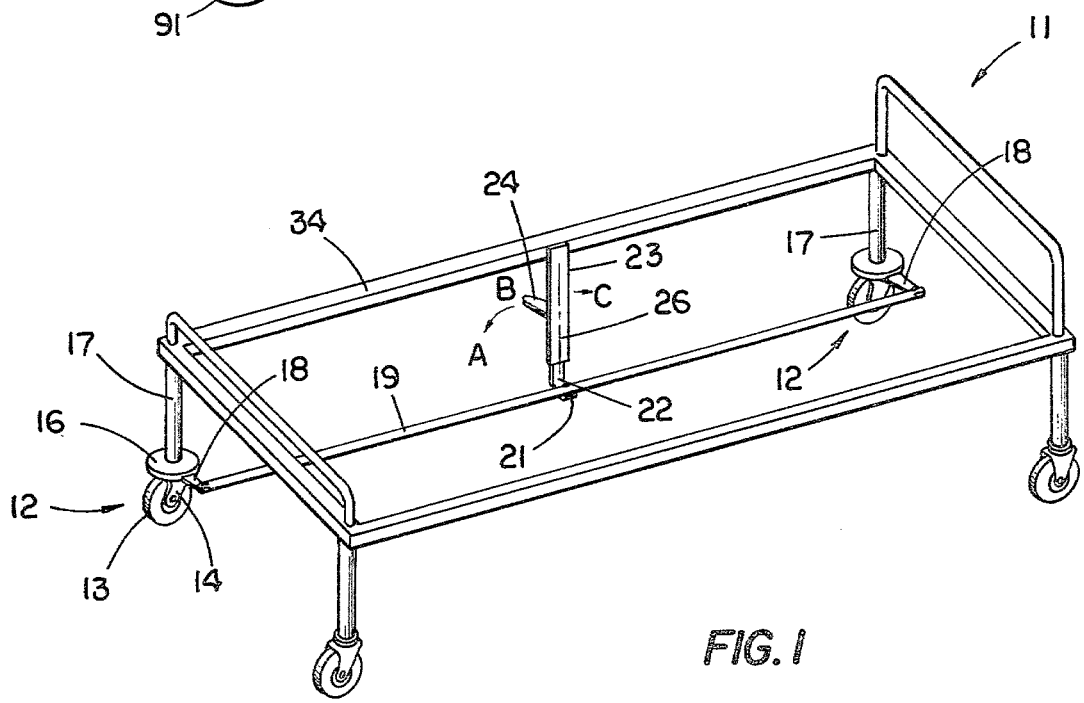
FIG. 1 is a perspective view of a bed employing casters thereon according to a typical embodiment of the present invention.

Referring now to the drawings in detail the hospital bed 11 of FIG. 1 has four casters mounted to it. Two of the casters 12 are constructed according to a typical embodiment of the present invention. They include wheel 13, horn 14, and housing 16, the latter being secured in the post or leg 17 of the bed. A brake actuator lever arm 18 projects from the housing of each of the casters and is pinned to a link 19 which is likewise pinned to arm 21 at the bottom of control shaft 22 mounted to braket 23 and having control handle 24 extending horizontally from it. Shaft 22 is mounted to the bracket 23 to pivot on a vertical axis 26 in order to be able to move between position "A", "B", and "C".

Figure 4:
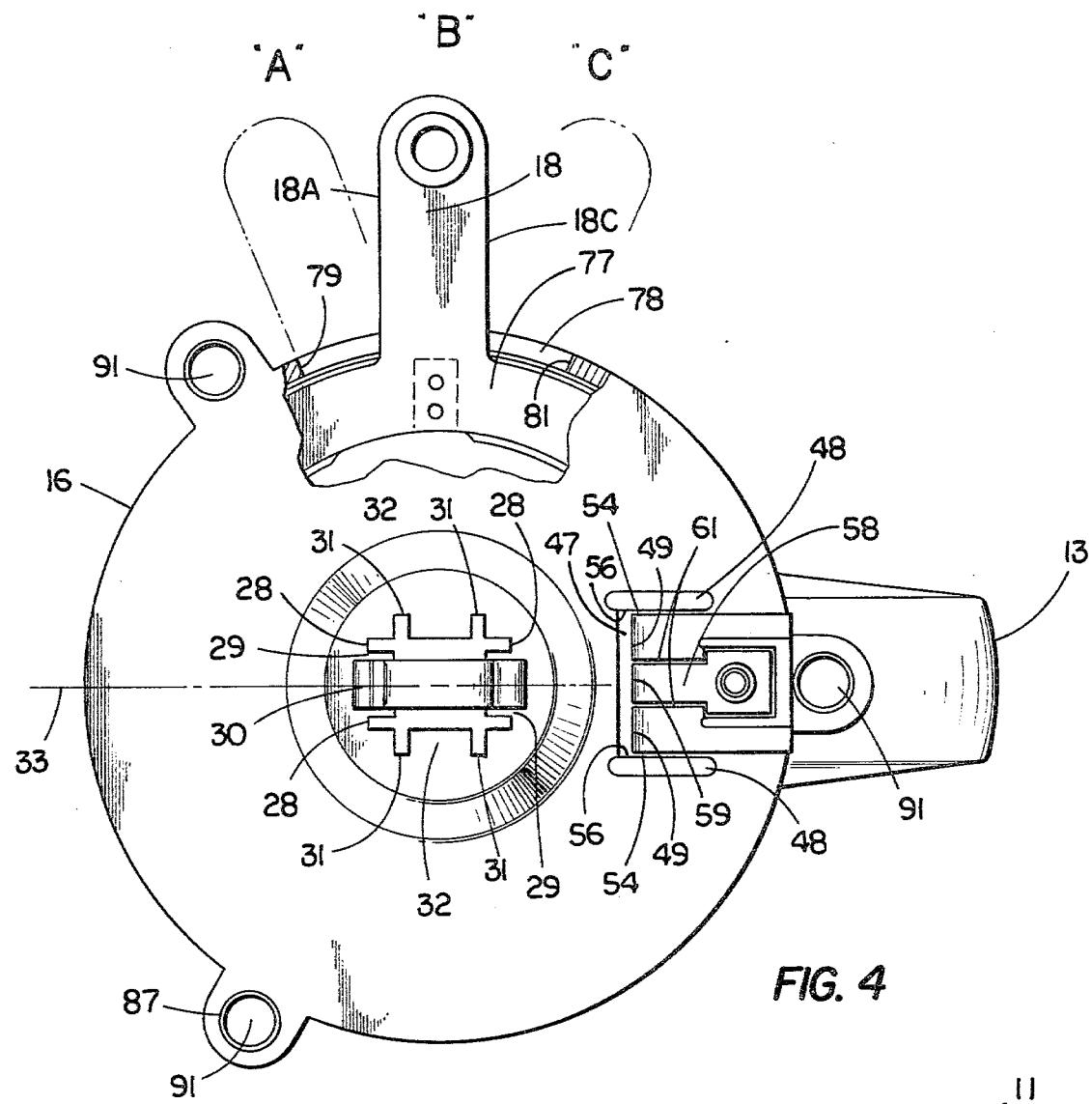
FIG. 4 is a top plan view of the caster assembly with the swivel lock position shown in solid lines.
Figure 2:
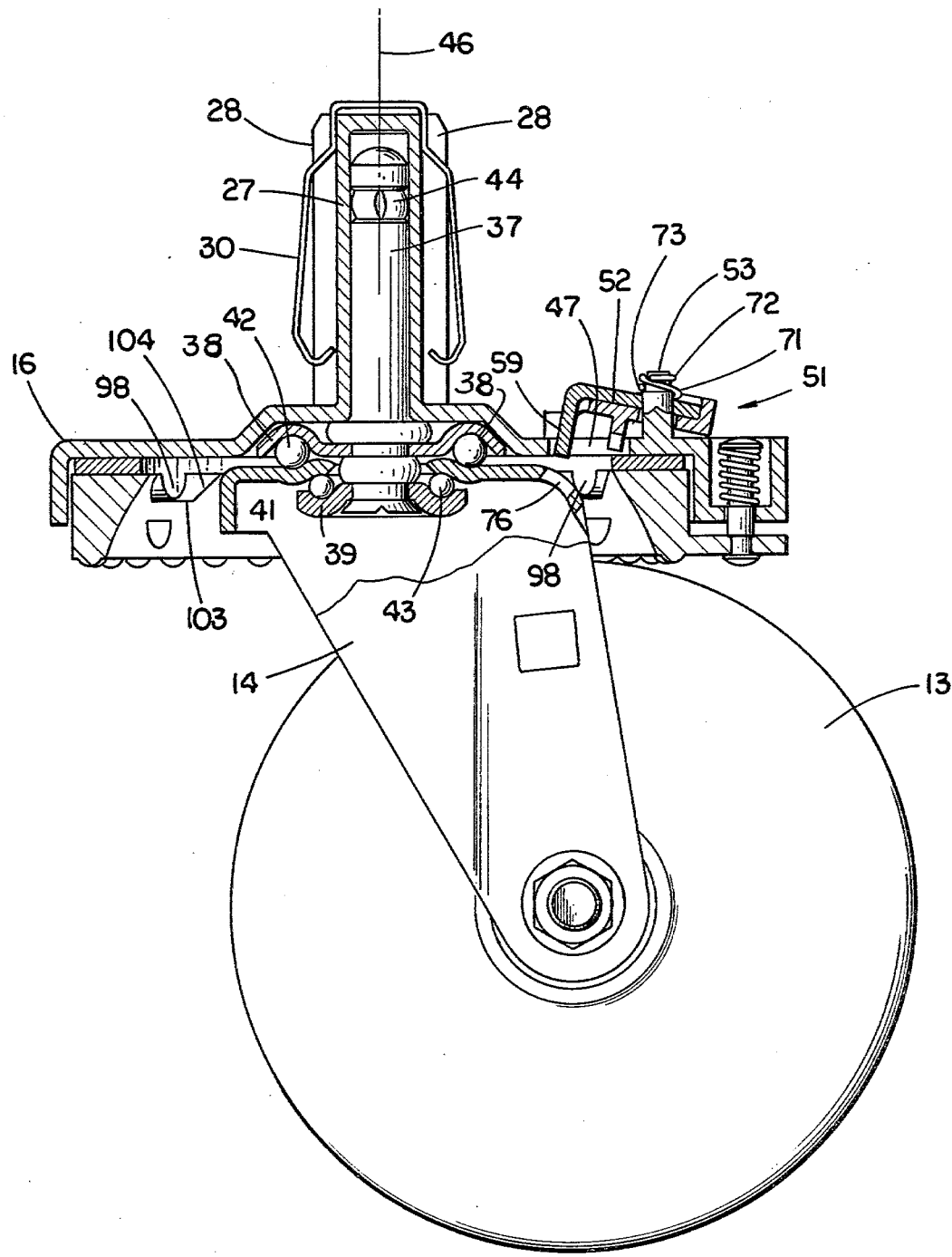
FIG. 2 is a side fragmentary view of a caster assembly, with a portion being shown in section to illustrate construction features according to a typical embodiment of this invention.
Figure 3:
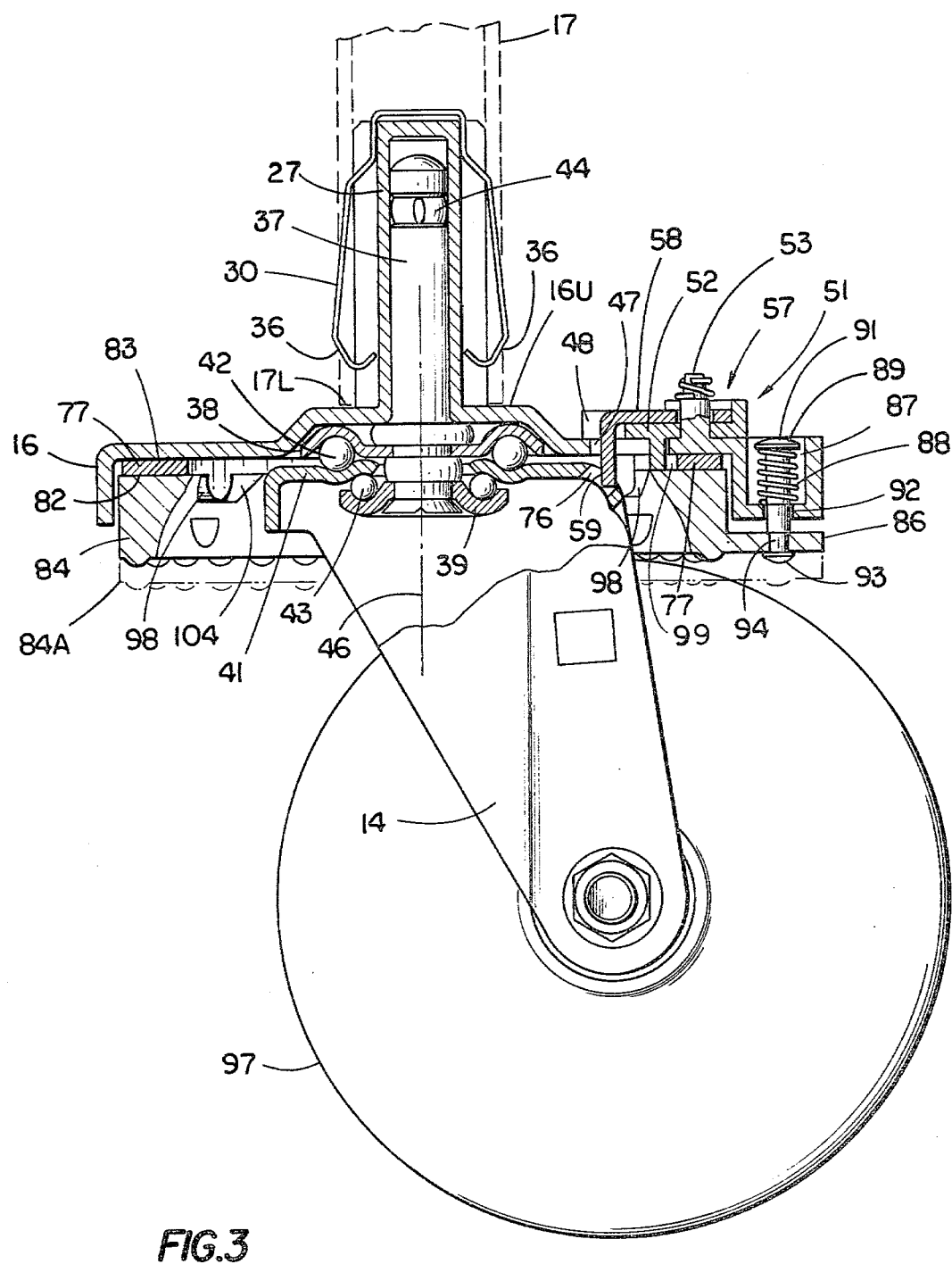
FIG. 3 is a view similar to FIG. 2 but showing the caster in the swivel lock condition and the combined swivel lock and brake condition in the dotted lines.

Referring now to FIGS. 2, 3 and 4, the housing 16 includes a post 27 with vertical flutes 28 providing channels 29 receiving a spring clip 30 to retain the post in a tube such as the bed leg 17. Additional flutes 31 are provided on the post and provide a channel 32 which may likewise be used for a spring clip or other means to secure the post in a tube. It is intended that the post be secured in the tube in a non-rotatable manner so that the longitudinal axis 33 of the caster assembly when the wheel is in the tracking or trailing position shown in the drawings, is parallel to the side rail 34 of the bed 11.

Therefore it should be understood that the flutes and spring clip 31 provide a very tight attachment of the housing 16 in the leg of the bed so the housing 16 will not rotate in the bed. It should be understood further, however, that the caster assembly can be removed from the bed leg if necessary, and the ramp 36 at the bottom of each of the legs of the spring clip 31 accommodates this. When the caster assembly is installed in the bed leg, the lower end 17L of the bed leg will be immediately above the upper face 16U of the housing 16. The meeting of these faces serves as a stop for the caster assembly upon installation in the bed leg.

The caster horn 14 is connected by stem 37 to upper and lower bearing retainers 38 and 39, respectively. These retainers, together with the configuration of the upper end of the horn at 41 provide races for two sets of bearing balls, the upper and primary load bearing set 42 and the lower set 43. The stem 37 is snugly received in the post 27 by means of the spring clip 44 bearing upon the inside wall of the post and received in a circumferential groove in the stem 37. Accordingly, the horn and wheel assembly are free to swivel about the swivel axis 46.

As shown in FIGS. 2, 3 and 4, housing 16 has an aperture 47 in the upper wall 16U thereof. This aperture is rectangular and has a pair of bosses 48 on opposite sides of the aperture. This aperture receives parallel downturned legs 49 of a tracking tab housing 51. This housing (FIGS. 2, 3, 11–13) has the base portion 52 having a round aperture receiving the upstanding post 53 therethrough, this post being an integral part of the brake housing 16. Therefore, the tracking tab housing is movable vertically to some extent with respect to the post 53 between an upper position shown in FIG. 2 and a lower position shown in FIG. 3 where the sides 54 of the tab housing legs are confined between the edges 56 of the aperture 47. When the tab housing is raised to the position shown in FIG. 2, these edges 54 are still confined between the inner faces of the bosses 48 which extend vertically upperward from the margins 56 of the aperture.

A tracking tab 57 is a generally L-shaped member including an apertured guide portion 58 having a central aperature therein receiving the post 53. It also has a leg portion 59 received between the inner edges 61 of the guide portion (including the legs 49) of the tracking tab housing 51. The features of the tracking tab housing which accommodate the tracking tab in it can be better understood with the help of FIGS. 11, 12, and 13 which show the aperture 62 which receives the post 53, the recess 64 which receives the apertured end of the tracking tab, and the channel between the guide edges 61 of the side guide portions 66 which blend into the down turned legs 49, basically forming a yoke in which the tracking tab and its downturned leg 59 are received and within which they are confined.

The tracking tab housing also includes a downwardly projecting rib 67 on the lower face of the portion 52 and which has a ramp portion 68 descending to the lower edge 69 of the rib.

A coil spring 71 (FIG. 2) having an upper loop 72 tightly secured to the post 53, bears downward on the top of the tracking tab at 73. Therefore it normally urges the tab and the tab housing downward to the position shown in FIG. 3. When the tab is in this position, the leg 59 thereof is received in the locking aperture 76 in the downwardly turned rear portion of the caster horn top 41. Because the tab leg 59 is confined between edges 61 of the tab housing 49 legs, and legs 49 are confined between the edges 56 of the housing aperture 47, the caster can not swivel about axis 46. In contrast, when the tracking tab housing and tab are in the position shown in FIG. 2, the tab is removed from aperture 76, and the caster is free to swivel.

Since the spring 71 normally urges the tracking tab downward, and since it is necessary for the tab to be up in the position of FIG. 2 in order for the caster to swivel freely, means are provided to cam the tracking tab housing upward to the position shown in FIG. 2. For this purpose an actuator ring 77 is provided. This ring has the arm 18 of FIG. 1 on it and, since the ring is confined in the housing 16, a slot 78 (FIGS. 4 and 5) is provided in the skirt of the housing 16. The ring is pivotable about the swivel axis 46, and the arm 18 is movable from the center position shown in the figures to a position "A" shown by the dotted line and in which the end 79 of the slot serves as an abutting stop for the edges 18A of the arm, and position "C" at the opposite extreme where the abutting end wall 81 of the slot serves as an abutment stop for the edge 18C of the arm 18. The solid outline position is the intermedate position "B".

Figure 5:
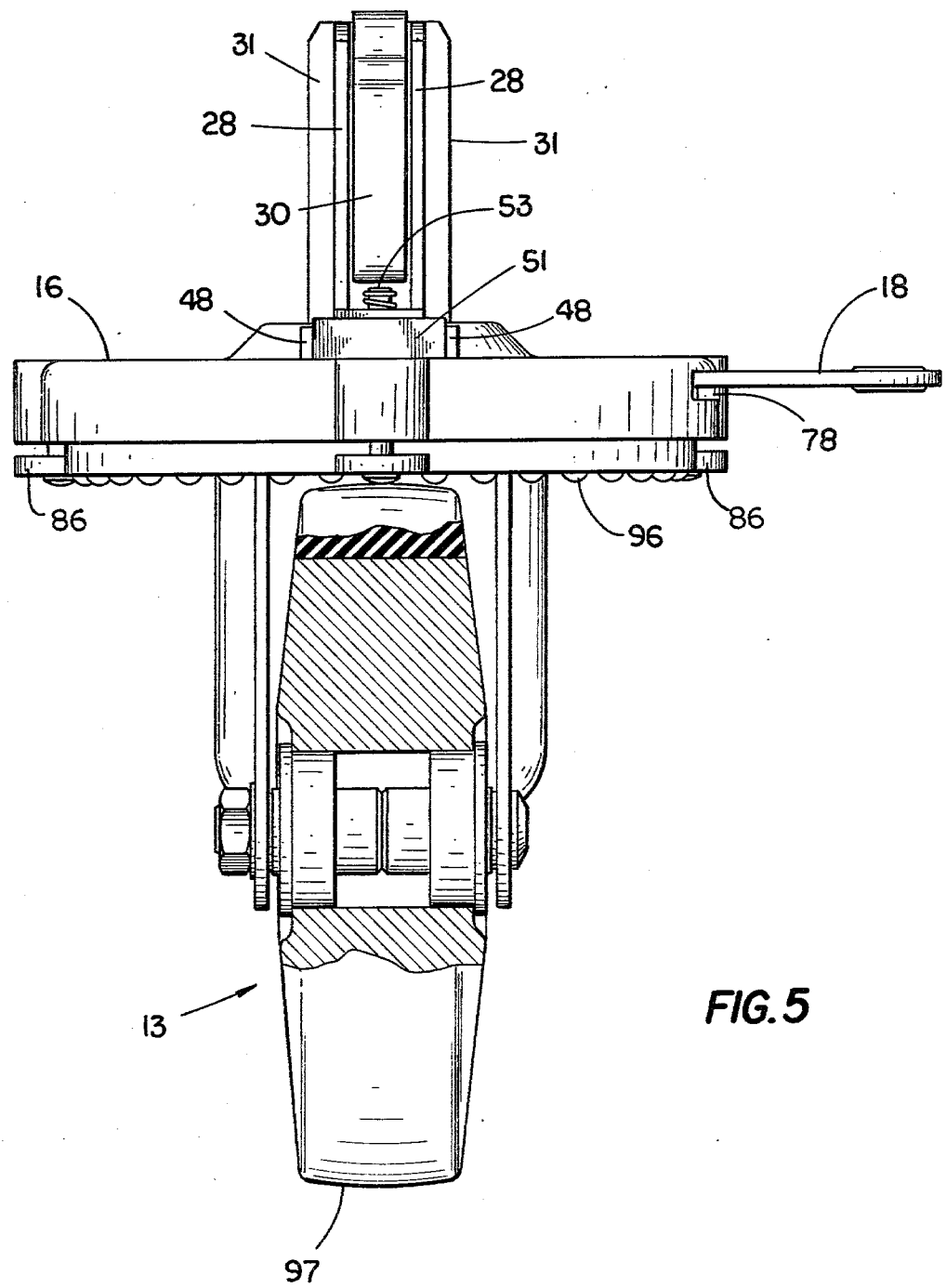
FIG. 5 is a rear view with the wheel shown partially in section.

The cam ring 77 has a flat lower face 82 which rests on a flat upper face 83 of a brake shoe 84. The brake shoe is also a ring and has three radially outwardly extending ears 86 disposed under and aligned with three radially outwardly extending pockets 87 in the brake housing 16. The bottom of each pocket supports a coil spring 88 whose upper end supports the head 89 of a rivet 91 guidingly received in an aperture 92 in the lower end of the pocket and having a head 93 at its lower end supporting the ear 86 of the brake shoe. A shoulder 94 on the rivet cooperates with head 93 to afix the brake shoe ear to the rivet. Three such rivet and spring assemblies provide three-point support for the brake shoe, two of these being ahead of the swivel axis and one of them directly behind the swivel axis. These springs normally urge the brake shoe into engagement with the underside of the actuator ring 77 which, inturn, abuttingly engages the underside of the housing 16. The drawing FIGS. 2, 3 and 5 show the brake shoe in the released position, where the bosses or buttons 96, which are in a circular array integral with the shoe itself, are clear of the tread 97 of the caster wheel 13. While it may appear in the elevational views that some of these buttons are in contact with the wheel, consideration of the fact that it is a circular array of the buttons, and that the rearwardmost button is spaced from the portion of the wheel with which it is aligned, will reveal that indeed there is a spacing.

Figure 9:
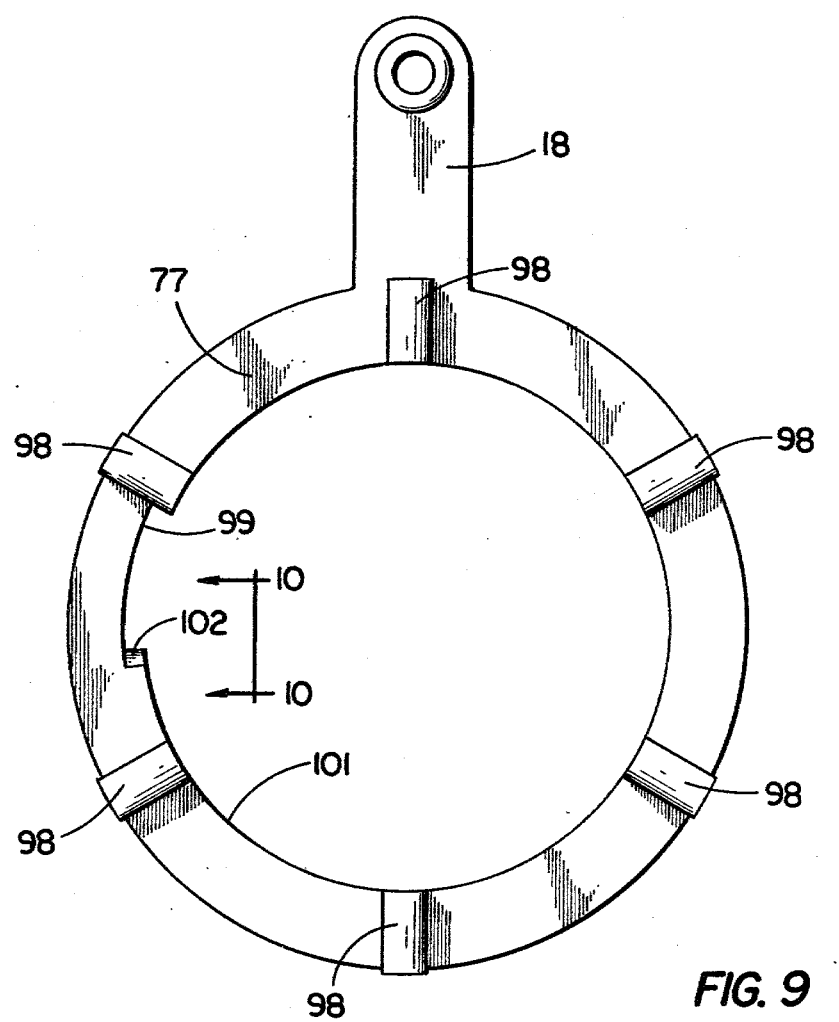
FIG. 9 is a bottom view of the actuator ring.
Figure 10:
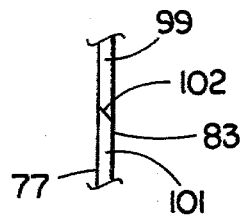
FIG. 10 is a fragmentary view taken at line 10—10 in FIG. 9 and viewed in the direction of the arrows.

Referring to FIG. 9, which shows the underside of the actuator ring, it will be seen that there is a plurality of rounded radially extending cams 98 circularly spaced on the ring. These project downward from the ring as shown in FIGS. 2 and 3. It should also be observed that the ring includes an elongate notch 99 in its inner wall 101. A ramp 102 is provided at one end of this notch 99 for a purpose which will be described.

Referring now to FIGS. 6, 7 and 8, there is shown a top view of the brake shoe itself in FIG. 6, and fragmentary elevations in FIGS. 7 and 8. As shown in FIG. 6, the ring includes a plurality of circularly spaced recesses 103 in the top surface thereof. As shown in FIG. 8, one end of each of these recesses has a cam ramp 104 thereon. As shown in FIG. 7, the opposite end of each of these recesses has a cam stop 106 therein of a shape similar to that of the cross section of the cam 98. As shown in FIGS. 2 and 3, the cams 98 are received in the recesses 103. However, when the arm 18 of the actuator ring is moved from the position "B" to the position C, the cams 98 move against the ramps 104 and drive the brake shoe downward to the position shown by the dotted line 84A in FIG. 3. This applies the buttons at the rearwardmost portion of the circle of buttons against the tire tread 97 to thereupon lock the caster wheel. The notch or recess 99 (FIG. 9) in the inner edge of 101 of ring 77 accommodates the rib 67 of the tracking tab housing without disturbing it, so the tracking tab remains in the recess 76 in the caster horn. Accordingly, both the swivel and wheel are locked. Even if it should happen that, when the arm 18 is moved to position "C" as from position "A", for example, the caster horn is not in a position of alignment of the tab 59 with the locking hole 76, the wheel will be locked by application of the brake shoe to the tread as the cams 98 acting against the ramps 104. When the arm 18 is in position against the stop 81 at the end of the slot in the housing, the cams will have risen up the ramps 104 and rested on the flat top surface 83 of the brake shoe. Therefore, the brake will not tend to release until, by intentional manipulation of the arm 18, the ring is rotated as the arm is pushed or pulled back toward position "B".

When the ring arm 18 is moved from position "B" in the counter clockwise direction to position "A", this being the release position, the ramp 102 at the end of the recess or notch 99 engages ramp 68 (FIGS. 12 and 13) of the tracking tab housing and further movement of the arm in the direction toward stop 79 will cause ramp 102 on ring 77 to cam upwardly ramp 68 on the tracking tab housing, whereupon both the tracking tab and the housing are cammed upward to the position shown in FIG. 2. Thus the tab is removed from the locking aperture in the caster horn, and the caster is then free to swivel. When the arm has reached abutment of the edge 18A thereof with the end 79 of the slot 78, the rib bottom 69 will be essentially flat against the flap top 83 of the ring 77.

The fact that the selection of caster conditions can be achieved by movement of the arm 18 in a horizontal plane about the swivel axis and through an arc of less than thirty degrees, facilities the control of several casters from a single location by apparatus readily mounted to the equipment supported by the casters. A simple example is the bed of FIG. 1. It is not necessary to modify the equipment itself in any way, such as required by some of the prior art, where it is necessary to have a plunger or other device in the leg of the apparatus to which the caster is mounted. If it happens that, when the arm 18 is moved to the "B" (swivel locking) position, from the free wheel and swivel position "A", the caster is not in the trail position, the tab leg 59 will bear on the top of the caster horn during at least a portion of any swiveling from that point, until the caster is in the trail position, whereupon the tab falls in the locking aperture 76. More typically, the bed or other device may be moved slightly so that all casters are in the trail position or essentially in the trail position, before the lever 18 is moved to the swivel lock position.

Another advantage of the present invention is the fact that the mounting housing 16, actuating ring 77 and brake shoe 84 can accommodate a variety of rather conventional types of casters, because the caster stem 37 and upper bearing race 38 can be essentially conventional. All that is needed is some provision such as aperture 76 or a notch in the caster horn to enable it to be latched into the trail position. The semicircle shaped projection in the brake shoe can readily embed into the tread of various casters having soft treads and, because there are several of them which are in position to engage the tread, they can do so to prevent slippage and damage to the tread of the wheel. Of course this occurs only when the arm 18 is moved to the swivel and wheel lock position "C".

Although a variety of materials might be employed, the housing would be preferably die cast metal, SAE 903 Zinc alloy, being an example. The brake shoe may also be made of the same material. The actuating cam may preferably be made of a six percent glass filled natural nylon, one example being product number 8320 by Allied Chemical and Dye Corporation. The horn, wheel, and bearings and stem may be of conventional construction. The cam track in the brake shoe should preferably be lubricated. The tracking tab housing may be of the zinc alloy material, while the tracking tab itself is preferably of hot rolled steel.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. In a caster assembly including mounting means for mounting a load to the caster assembly, a horn swivel mounted to said mounting means to swivel about a swivel axis, and a wheel rotatably mounted to said horn, whereby said caster assembly is adapted to support a load and swivel to facilitate rolling the load horizontally in various directions, there being a relative position of said horn to said mounting means and referred to as a tracking position for obtaining a tracking direction of rolling the load, the improvement comprising:
   a brake shoe coupled to said mounting means and movable from an "off" position to a "wheel lock" position wherein said brake shoe engages said wheel to prevent rotation of said wheel;
   actuator means coupled between said mounting means and said brake shoe and operable to move said brake shoe to said "wheel lock" position; and
   a swivel lock including a tracking tab supported on said mounting means, and a tab receiver in said horn, said tab and receiver being aligned when said horn and mounting means are in said tracking position,
   said tab being movable from a swivel release position to a swivel lock position where a portion of said tab is received in said receiver and locks said horn and said mounting means in said tracking position,
   said actuator means including a portion operable about said swivel axis to move said tab between said swivel lock and swivel release position.

2. The improvement of claim 1 wherein:
said actuator means portion includes a ring centered on said swivel axis and movable about said axis between three discrete positions of rotational index, namely: position "A" for free wheel and swivel; position "B" for free wheel but swivel lock in tracking position; and position "C" for swivel lock and wheel lock.

3. The improvement of claim 2 wherein:
said brake shoe is circular concentric with said ring, and said ring has brake cam means thereon engaged with said brake shoe for driving said brake shoe from "off" position to "wheel lock" position when said ring is moved to position "C".

4. The improvement of claim 2 and further comprising:
first resilient biasing means coupled to said mounting means and to said tracking tab and urging said tab toward said horn, and thereby urging said tab into said receiver when the horn and mounting means are in tracking position.

5. The improvement of claim 4 wherein:
said actuator ring has swivel lock release cam means thereon coupled to said tracking tab and normally maintaining said tab out of engagement with said horn and precluding said tab from entering said receiver, except when said actuator is in and between positions "B" and "C".

6. The improvement of claim 1 or 5 wherein:
said horn has a top, and said mounting means include a brake housing having a top covering at least a portion of said top of said horn, the improvement further comprising:
an aperture through said top,
an upstanding post on said top adjacent said aperture,
guide means adjacent said aperture and guidingly confining said tracking tab horizontally when said tab is in said swivel lock and swivel release positions and when said tab is between said swivel lock and swivel release positions.

7. The improvement of claim 6 wherein:
said guide means include a tracking tab housing having a base portion resting on said brake housing top adjacent said aperture and having an aperture therein receiving said post therethrough and having a pair of horizontally spaced side guide portions with guide legs downturned through said brake housing top aperture, and said tracking tab housing having outside edges immediately adjacent edges of said brake housing top aperture, for horizontal confinement of said tracking tab in said brake housing top;
said tracking tab normally nests on said tab housing base portion and has a downturned leg parallel to said housing legs and guidingly received between them, and
said tracking tab has an aperture therein receiving said post therethrough.

8. The improvement of claim 7 wherein:
a spring is mounted to said post and bears downward on said tracking tab, urging said tab against said tracking tab housing, and thereby urging said tab housing toward said caster horn.

9. The improvement of claim 7 wherein:
said guide means include parallel walls on said brake housing top and upstanding from said aperture edges and horizontally confining said tab housing guide legs.

10. The improvement of claim 9 and further comprising:
a rib on said tab housing and projecting downward from said tab housing through said aperture when said base portion of said tracking tab housing is resting on said brake housing top, said rib having a ramp thereon engageable by said portion of said actuator to force said tab housing, and thereby said tab, upward to remove said tab leg from possible reception in said tab receiver in said horn.

11. The improvement of claim 10 wherein:
said guide walls project upwardly a sufficient distance to maintain engagement with outside edges of said tab housing guide legs.

12. The improvement of claim 10 wherein:
said tab receiver is a hole in the top of the horn.

13. The improvement of claim 3 and further comprising:
a resilient circumferential tread member on said wheel;
a plurality of circularly spaced protrusions on the bottom of said brake shoe, some portion of said protrusions being engagable with said tread member when said brake shoe is in "wheel lock" position, regardless of the position of said wheel about said swivel axis.

14. The improvement of claim 13 and further comprising:
a plurality of brake release springs circularly spaced around said housing and normally urging said brake shoe toward "off" position.

15. The improvement of claim 13 wherein:
said caster horn has a top having a circular area thereof at a radius from said swivel axis substantially equal to the distance of said portion of said tab from said swivel axis and which area is substantially smooth except at said tab receiver, whereby said tab portion can rest on said area when said actuator ring has been moved from position "A" to position "B" and permit swiveling of said caster until said tab drops into said receiver to lock said horn in tracking position.

16. The improvement of claim 13 and further comprising:
an equipment item having a leg, said caster mounting means including a post affixed to said leg;
a lever arm on said ring;
a control arm on said item;
a horizontally extending link connected to said lever arm and control arm; and
a manual operator connected to said control arm and operable about a vertical axis parallel to said swivel axis, through three manual control positions to selectively place said ring in positions "A", "B" and "C".

17. In patient care equipment items, the improvement comprising:
a hospital bed having four legs, at least two legs on one side being tubular, and casters on all four legs, two of said casters having mounting means thereon with mounting posts on said mounting means non-rotatably received in said two legs,
each of said two casters having a horn swivel mounted to said mounting means to swivel about a swivel axis, and a wheel rotatably mounted to said horn, whereby said caster is adapted to support a load and swivel to facilitate rolling the load horizontally in various directions, there being a relative position of said horn to said mounting means and referred to as a tracking position for obtaining a tracking direction of rolling the load; each of said two casters further comprising:
a brake shoe coupled to said mounting means and movable from an "off" position to a "wheel lock" position wherein said brake shoe engages said wheel to prevent rotation of said wheel;
actuator means coupled between said mounting means and said brake shoe and operable to move said brake shoe to said "wheel lock" position; and
a swivel lock including a tracking tab supported on said mounting means, and a tab receiver in said horn, said tab and receiver being aligned when said horn and mounting means are in said tracking position,
said tab being movable from a swivel release position to a swivel lock position where a portion of said tab is received in said receiver and locks said horn and said mounting means in said tracking position,
said actuator means including a portion operable about said swivel axis to move said tab between said swivel lock and swivel release position,
said actuator means portion including a ring centered on a swivel axis and movable about said axis between three discrete positions of rotational index, namely: position "A" for free wheel and swivel; position "B" for free wheel swivel lock in tracking position; and position "C" for swivel lock and wheel lock;
said brake shoe being circular and concentric with said ring, and said ring having brake cam means thereon engaged with said brake shoe for driving said brake shoe from "off" position to "wheel lock" position when said ring is moved to position "C";
a resilient circumferential tread member on said wheel; a plurality of circularly spaced protrusions on the bottom of said brake shoe, some portion of said protrusions being engagable with said tread member when said brake shoe is in "wheel lock" position, regardless of the position of said wheel about said swivel axis;
a lever arm on said ring of each of two said casters;
a control arm on said hospital bed;
a horizontally extending link connected to said lever arm of each of said two casters and to said control arm; and
a manual operator connected to said control arm and operable about a vertical axis parallel to said swivel axis, through three manual control positions to selectively place said rings of said two casters in positions "A", "B" and "C", whereby both of said casters are simultaneously controlled by said manual operator.

* * * * *